Patented Apr. 4, 1939

2,152,640

UNITED STATES PATENT OFFICE 2,152,640

METHOD OF REMOVING FROM WOOL CERTAIN OTHER FIBERS

Carl S. Ferguson, Needham, Mass.

No Drawing. Application June 17, 1936,
Serial No. 85,701

6 Claims. (Cl. 8—140)

This invention relates to a method of removing from wool-containing material, such as woolen or worsted waste stock, any fibers of silk and/or cellulose acetate which may be therein. In reclaiming wool from woolen and worsted waste stock, it is desirable to separate the pure wool from foreign fibers which may be mingled with the wool fibers. For complete removal of foreign fibers, they must be destroyed or rendered friable by treatment which will not destroy or injure the wool fibers. Most vegetable fibers, such as cotton, are readily removed by well known carbonizing treatments, which, however, are not effective for other types of fiber such as natural silk.

It is an object of the present invention to provide a process for treating wool-containing mixtures in such a manner as to destroy by solution fibers of natural silk therein without injuring the wool. It is a further object of the invention to employ a similar process for treating fibers of cellulose acetate so as to condition them for removal with cellulose fibers by a carbonizing treatment such as is customarily employed for the removal of cellulose fibers.

In carrying out the invention, a mixture of fibers, including wool and natural silk or cellulose acetate fibers, is treated with a solution of zinc chloride. As this chloride when used alone is liable to injure the wool and acts too rapidly for proper control, I employ therewith a softening or restraining substance which does not interfere with the chemical action of the zinc chloride on the natural silk or cellulose acetate fibers, but which protects the wool fibers from being injured by the zinc chloride and slows its action so as to permit proper control. For this purpose, I prefer to employ calcium chloride which is dissolved in the solution with the zinc chloride. I may vary the ratio between the two chlorides through a wide range but find that the best results are obtained when the ratio is between 7:3 and 3:7. Preferably, I mix the zinc chloride and calcium chloride in solution in approximately equal amounts, the calcium chloride being somewhat in excess of the zinc chloride. By way of specific example, I may prepare the solution by dissolving in 1 gallon of water 8 pounds of commercial zinc chloride and 10 pounds of flake calcium chloride, the boiling point of such a solution being approximately 265° F. at normal atmospheric pressure, but it is to be understood that the invention is not limited to this or any other specific proportion of these ingredients. The foregoing proportions of ingredients result in a concentrated solution having a specific gravity of approximately 1.65 at room temperature.

In order to complete the treatment of the fiber mixture with the chloride solution within a reasonable time, the solution should be used hot, preferably from 215° to 230° F., although temperatures higher and lower than these may be successfully employed. The treatment of the fiber mixture with the chloride solution preferably consists of immersing the fibers in a bath of the solution and agitating the mixture constantly during the treatment. Ordinarily such treatment takes about 8 to 15 minutes, the required time depending upon various factors, such as concentration of solution, proportion of ingredients, and temperature.

After the fiber mixture has been sufficiently treated to dissolve any fibers of natural silk which may be present, the solution may then be extracted from the residual fibers by means of any suitable apparatus such as squeeze rolls or a centrifugal extractor. The fibers may then be rinsed with water containing a slight amount of some acid, such as hydrochloric or acetic acid, which is capable of increasing the solubility of the chemicals and hastens their removal from the fibers, after which the fibers are thoroughly washed with plain water.

The foregoing treatment not only removes the fibers of natural silk but also conditions any cellulose acetate fibers which may be present, so that, if the fiber mixture is then subjected to a carbonizing treatment such as customarily employed for the removal of cellulose fibers such as cotton, the conditioned fibers of cellulose acetate will respond to the carbonizing treatments. The carbonizing process may include treatment with sulphuric acid, hydrochloric acid gas, or aluminum chloride solution, followed by baking, dusting, washing and neutralizing in the customary manner. For example, the fibers may be soaked for an hour or two in dilute sulphuric acid, after which the excess acid is extracted and the fibers are placed in drying ovens and agitated therein at a temperature of approximately 200° F. until dry. This treatment does not affect the wool fibers, but renders the vegetable fibers brittle and friable. The fibers are then put through a beater or duster which pulverizes the brittle vegetable fibers, the resultant dust being removed by a suitable blower. The residual wool fibers are neutralized by immersion in a weak solution of soda ash, washed thoroughly, and dried.

It is evident that various modifications and changes may be made in the steps of the process herein described without departing from the spirit or scope of the invention as defined in the following claims.

I claim:

1. A method of treating a mixture of fibers including wool and cellulose acetate fibers, which comprises agitating the fibers in a bath of hot concentrated solution of zinc chloride and calcium chloride, washing the treated mixture, and subjecting the mixture to a carbonizing treatment to remove the cellulose acetate.

2. A method of treating a fiber mixture containing wool and natural silk, which comprises immersing the mixture in a bath of concentrated solution of zinc chloride and calcium chloride at a temperature of 215° to 230° F., agitating the submerged fibers until the silk fibers are dissolved, removing the residual fibers from the bath, extracting the liquor from the fibers, and washing.

3. A method of treating wool mixed with natural silk and cellulose acetate fibers, which comprises treating the mixed fibers with a hot concentrated solution of zinc chloride and calcium chloride substantially free from inorganic acids until the silk is dissolved and the cellulose acetate is conditioned for subsequent carbonization, and washing the residual fibers.

4. A method of treating mixed wool and natural silk fibers, which comprises treating the mixed fibers with a hot concentrated solution of zinc chloride and calcium chloride substantially free from inorganic acids until the silk therein is dissolved, and washing the residual fibers.

5. A method of treating mixed wool and natural silk fibers, which comprises treating the mixed fibers with a hot concentrated solution of zinc chloride and calcium chloride substantially free from inorganic acids until the silk therein is dissolved, rinsing the residual fibers with dilute hydrochloric acid, and washing with water.

6. A method of treating mixed wool and natural silk fibers, which comprises treating the mixed fibers with a hot concentrated solution of zinc chloride and calcium chloride to dissolve the silk therein, said solution being substantially free from inorganic acids and containing the zinc and calcium chlorides in a ratio of about 4:5 dry weight, extracting the solution, and washing the residual fibers.

CARL S. FERGUSON.